United States Patent [19]

Miquel et al.

[11] Patent Number: 4,820,583

[45] Date of Patent: Apr. 11, 1989

[54] TRANSPARENT COMPOSITE POLYESTER FILMS CAPABLE OF BEING USED IN PARTICULAR FOR PRODUCING HIGH-GLOSS METALLIZED FILMS

[75] Inventors: Huquette Miquel, Chaponost; Marcel Eyraud, Lyons, both of France

[73] Assignee: Rhone-Poulenc Films, Courbevoie, France

[21] Appl. No.: 134,072

[22] Filed: Dec. 17, 1987

Related U.S. Application Data

[62] Division of Ser. No. 10,544, Feb. 3, 1987.

[30] Foreign Application Priority Data

Feb. 14, 1986 [FR] France ............................... 86 02207

[51] Int. Cl.$^4$ ............................................. B32B 15/00
[52] U.S. Cl. ................................... 428/333; 428/480; 428/900; 428/458
[58] Field of Search ................ 428/900, 458, 480, 333

[56] References Cited

U.S. PATENT DOCUMENTS

| 4,687,700 | 8/1987 | Hensel et al. | 428/480 |
| 4,704,325 | 11/1987 | Crocker | 428/458 |
| 4,708,905 | 11/1987 | Yoshii et al. | 428/458 |

FOREIGN PATENT DOCUMENTS

0088634 9/1983 European Pat. Off. .

OTHER PUBLICATIONS

Patent Abstracts of Japan, vol. 6 (84) pp. 96, 117.

*Primary Examiner*—Edith Buffalow
*Attorney, Agent, or Firm*—Sherman & Shalloway

[57] ABSTRACT

The invention relates to composite thermoplastic polyester films with outstanding transparency, low surface roughness and good machinability. These films contain, in at least one outer layer, 0.1 to 1% of fine particles with a volume median diameter of between 0.6 and 1.5 micrometers. After being metallized, these films produce highly glossy films with a particularly low gloss difference between the 2 faces.

16 Claims, No Drawings

TRANSPARENT COMPOSITE POLYESTER FILMS CAPABLE OF BEING USED IN PARTICULAR FOR PRODUCING HIGH-GLOSS METALLIZED FILMS

This is a division of application Ser. No. 010,544, filed Feb. 3, 1987.

The present invention relates to multilayer composite films having outstanding transparency, good machinability and capable of producing high-gloss films after metallizing.

There have already been proposed thermoplastic films such as polyester films intended for metallizing and resulting, after metallizing, in films which can be used in particular as high-performance reflective surfaces. These films need to have a very low surface roughness on the metallizable face, in order to produce outstanding reflective properties of the metal layer; the need to have a very low surface roughness, however, leads to major difficulties when the film is reeled on industrial machines; the machinability of the film (the film's capacity for being satisfactorily wound at high speed on industrial machines) needs to be improved.

It has thus been proposed to use films containing a small quantity of very fine particles; these films consequently do not have a maximum transparency and as a result have a relatively high percentage of scattered light; the metallized films resulting therefrom can then be used in the reflecting surface application only on the side of the metallized face which needs, however, to be protected by the deposition of a protective varnish. Overall, these films have an inadequate machinability, require the presence of a protective varnish on the metallized layer and cannot, in some case, be employed as reflective films when the reflection takes place through the unmetallized layer of the film. In other words, in these applications, it must be stressed that the film itself cannot be used as the protective layer for the metallized film.

Unfilled polyester films on which a deposit of very fine silica particles has been deposited before metallizing and between the drawing operations, have also been recommended for use in a reflecting surface application. These films have a very low percentage of scattered light and, consequently, good transparency, but inadequate machinability. Furthermore, the abrasion resistance is low. Such films are described in French Patent No. 2,178,119.

It has also been proposed to use coextruded films consisting of two drawn layers, one being filled and contributing the slip properties (machinability), the other being unfilled and thus having a surface of very low roughness and intended to receive the glossy metallized layer. Coextruded metallized films will necessarily have a protective varnish deposited subsequently on the metallized layer. Films of this kind, which are, furthermore, not completely transparent and which have a relatively high percentage of scattered light are described, for example, in U.S. Pat. No. 4,307,150; the use of a protective varnish offers the disadvantage of necessitating an additional industrial operation and of reducing the film's gloss, but this deposition is made necessary by the fact that the unmetallized layer of the film cannot be used as the protective layer, since, being filled, the former does not have the required transparency characteristics.

Thus, at the present time there is no film which simultaneously has outstanding transparency, low surface roughness, good machinability, good abrasion resistance and which, after metallizing, produces high-gloss films. There therefore arose the problem of producing such films. The invention meets precisely this objective and contributes a solution to the above problem in the field of composite films.

More precisely, one of the subjects of the present invention consists of transparent, drawn thermoplastic composite films of low surface roughness, consisting of an essentially unfilled middle layer (A) covered on at least one of its faces with a filled layer (B) containing fine particles in a dispersed state, the film being characterized in that it has the following combination of properties:

percentage of scattered light $< 1$
total roughness of the outer faces $R_T < 0.15$
coefficient of film-on-film friction (face 1 against face 2), measured in a dynamic and static regime such that $\mu_s < 0.6$ (static regime)

$\mu_d < 0.5$ (dynamic regime)

The composite films of the present invention produce, under the usual metallizing conditions, metallized films having particularly high gloss, which can be observed directly or indirectly through the transparent portion, the latter acting as the protective coating.

Within the scope of the invention, and this constitutes another subject of the present invention, the composite films have the following characteristics:

percentage of scattered light $\leq 0.8$
roughness $R_T \leq 0.12$

The composite films of the present invention may be so-called thin films, whose thickness is usually between 5 and 50 micrometers, and so-called thick films, whose thickness is greater than 50 micrometers and lower than or equal to 200 micrometers.

The transparency and hence the value of the percentage of light scattered by the film (i.e. y) are obviously a function of the film thickness x.

Films such as described above and for which the percentage of scattered light satisfies the following inequality:

$$y \leq \frac{x}{400} + 0.5 \text{ (x in micrometers)}$$

and preferably the following inequality:

$$y \leq \frac{x}{500} + 0.4$$

constitute a preferred subject of the present invention.

The films of the invention comprise at least one outer layer (B) which is noteworthy in the sense that it contains, in a dispersed state, fine particles of specific size and used in specific quantities.

In point of fact, it is a specific choice of filler that makes it possible to arrive, insofar as the metallized film is concerned, at an advantageous compromise between the properties of transparency, machinability, percentage of scattered light and gloss.

It has been found, in fact, that films which have at least one layer (B) and which contain from 0.1 to 1% by weight of particles with a volume median diameter of between 0.6 and 1.5 micrometers, the thickness of the layer (B) not exceeding 3 micrometers, were suitable within the scope of the present invention. These films thus form another subject of the present invention; preferably, the thickness of the layer (B) does not exceed 1.5 micrometers and is advantageously between 0.3 and 0.8 micrometer.

According to an advantageous alternative form of the present invention, the particles present in the layer (B) have a volume median diameter of between 0.6 and 1 micrometer.

In the field of thin films, the layer (B) advantageously contains from 0.3 to 1% by weight of filler whose volume median diameter is between 0.6 and 1 micrometer, while the thickness of the layer (B) is less than 1.5 micrometers.

The particles present in the layers (B) may correspond to fine particles introduced into the polymeric composition and/or to particles originating from catalyst residues or precipitation adjuvants. The roughness is preferably introduced by the introduction of fine inert particles into the polymeric composition which, after drawing, produces the layer (B).

The nature of the added inert particles in the layer (B) may vary widely; they may be inorganic particles (oxides or salts of elements of groups II, III and IV of the Periodic Table of the elements) or alternatively polymeric particles. Silica, silicoaluminates, calcium carbonate, MgO, $Al_2O_3$, $BaSO_4$, $TiO_2$ and the like may be mentioned by way of illustration among the fillers which may be used. Natural or synthetic calcium carbonate will be advantageously used as filler.

When the films of the present invention comprise two layers (B) as outer faces, these two layers (B) may, within the scope defined earlier, differ from each other in the quantity of fine particles present, in the volume median diameter of these particles or alternatively in the thickness of the layer; according to a preferred alternative form, the two layers (B) are identical.

The layer (A) forming the middle layer of the composite films of the present invention is preferably a layer which does not contain fine particles capable of affecting the percentage of scattered light and/or the surface roughness. It is possible, however, especially in the case where a part of the films of the present invention is recycled during the preparation of a new batch of film, to use, as a polymeric composition intended for the production of the layer (A), a composition containing not more than 100 ppm of filler capable of affecting the percentage of scattered light and/or the surface roughness.

The films of the present invention are noteworthy in the sense that they also have an outstanding abrasion resistance. This result is observed particularly in the case of so-called thin films.

The determination of abrasion resistance is conveniently carried out by measuring the values of the coefficient of film-on-metal friction when the film is unreeled. This coefficient, known as $\mu_k$, corresponds to a friction of the film travelling at low speed over stationary metal rolls or roller wheels. The value of the coefficient $\mu_k$ generally becomes constant after a certain number of meters of tape have passed; in practice, the coefficient $\mu_k$ has become constant after the passage of 10 m of the tape. This is why $\mu_k$ is measured at the initial moment $[(\mu_k)_0]$ and after the passage of 10 m and 400 m of tape $[(\mu_k)_{10}]$ and $[(\mu_k)_{400}]$; the measuring method will be defined later.

When the film resists abrasion, it is found that the value of $\mu_k$ remains practically constant as the tape travels past; the increase in $\mu_k$ with the quantity of tape travelling past thus forms a measure of the abrasion resistance of the film.

Furthermore, the appearance of powder or dust on the roller wheel during the passage of the film constitutes a convenient test for the determination of abrasion.

The films of the present invention are noteworthy in the sense that they exhibit a low change in $\mu_k$ while the film travels past. This change, known as $\Delta\mu_k$ is characterized as follows:

$$\Delta\mu_k = \frac{(\mu_k)_{400} - (\mu_k)_{10}}{(\mu_k)_{10}} \times 100 \leq 40$$

preferably, the value of $\Delta\mu_k$ does not exceed 25.

The composite films of the present invention are advantageously composite polyester films which consist of crystalline or semicrystalline polyester, both in the layer (A) and in the layers (B). The following description will be principally concerned with polyester films; the latter are produced from polyesters which are known per se, having, after the usual extrusion, drawing and heat-setting processes, satisfactory mechanical properties which enable them to perform the function of a base film (high modulus, dimensional stability etc); the polyesters may be any straight-chain or essentially straight-chain film-forming polyester leading to crystalline or semicrystalline polyesters, and such as are obtained by starting with one or more dicarboxylic acid(s) or their lower alkyl esters (terephthalic acid, isophthalic acid, 2,5-naphthalenedicarboxylic acid, 2,6-naphthalenedicarboxylic acid, 2,7-naphthalenedicarboxylic acid, succinic acid, sebacic acid, adipic acid, azelaic acid, diphenyldicarboxylic acid and hexahydroterephthalic acid) and one or more diols or polyols such as ethylene glycol, 1,3-propanediol, 1,4-butanediol, neopentyl glycol and 1,4-cyclohexanedimethanol, polyoxyalkylene glycols (polyoxyethylene glycol, polyoxypropylene glycol or random or block copolymers thereof).

In general, the polyesters used are homopolymers or copolymers containing essentially alkylene terephthalate repeat units; the said polyesters preferably comprise at least 80% by weight of ethylene terephthalate repeat units and, still more preferably, at least 90% by weight of such repeat units. The polyester may also be a mixture of several polycondensates 80% by weight and preferably 90% by weight of which are polyethylene terephthalate.

Advantageously, the polyester is a polyethylene terephthalate whose intrinsic viscosity IV, measured at 25° C. in o-chlorophenol lies between 0.6 and 0.75 dl/g.

The preparation of polyesters of this kind is known per se. The catalysts, stabilizers and additives employed within the scope of the present invention are not critical.

The evidence for the crystallizability or crystallinity of the polymers is revealed by any means which is well known to the specialist, such as, for example, differential thermal analysis, in which crystalline melting peaks are examined. In this context, reference may be made to the paper by S. H. Lin and J. L. KOENIG in the Journal of Polymer Science Symposium 71, 121-135 (1984); the degree of crystallinity of the polymer layer in the film increases with the increase in the surface area of the peak observed in differential thermal analysis and is obviously a function of the nature of the polymer and of the physical (drawing etc) and/or thermal (heat-setting) processes which it has undergone.

The density test (major density change) also makes it possible to check in a simple manner whether the polyester is in the crystalline or semicrystalline state.

The composite films of the present invention may be produced by various conventional processes. For simplicity, the description will chiefly concern, for the sake of clarity, the production of coextruded films leading to an amorphous film which becomes crystalline or semicrystalline after being drawn. Thus, the films, such as polyester films, are produced advantageously by means of coextrusion by feeding a multichannel die or a distribution box, on the one hand with an unfilled polyester producing amorphous films which become crystalline or semicrystalline after they have been subjected to a drawing treatment and then to a heat-setting treatment and, on the other hand, with a filled polyester which becomes crystalline or semicrystalline after being drawn and heat-set.

The drawing operation, within the scope of the present invention, consists of at least one unidirectional drawing operation performed on an amorphous composite film, so as to endow the film with a satisfactory combination of mechanical properties (high moduli, good dimensional stability, etc). It may therefore involve a single drawing or a double drawing operation performed in succession or simultaneously in both directions, generally at right angles or, yet again, sequences of at least 3 drawing operations where the drawing direction is changed at each sequence. Furthermore, each unidirectional drawing may itself be performed in several stages. Thus, drawing sequences may be combined, such as, for example, two successive biaxial drawing treatments, it being possible to perform each drawing operation in several stages.

Lastly, according to an advantageous alternative form of the present invention, films such as defined above have undergone a biaxial drawing treatment in two directions at right angles to each other.

More precisely, the drawing may be performed successively, firstly in the machine direction (lengthwise drawing) and then at right angles to the machine direction (transverse drawing) or vice versa, that is to say that a transverse drawing operation is then performed, followed by a lengthwise drawing operation. The data which follow relate more especially to polyalkylene terephthalates and particularly to polyethylene terephthalate.

In general, in the case of the latter, lengthwise drawing is performed in a ratio of 3 to 5 (that is, to say that the length of the drawn film represents from 3 to 5 times the length of the amorphous film) and at a temperature of 80° to 100° C. in the case of the polyester, and transverse drawing is performed in a ratio of 3 to 5, at a temperature of 90° to 120° C.

The drawing operation may also be performed simultaneously, that is to say simultaneously in the lengthwise direction and in the transverse direction, for example with ratios of 3 to 5 and at a temperature of 80° to 120° C.

Depending on the choice of the drawing conditions, it is possible to produce individual surface morphologies, such as the presence of cavities surrounding a protuberance. This possibility of giving rise to individual morphologies depends, furthermore, on the choice of the polymer and on its adjuvants.

The composite films of the present invention may be employed in various fields such as, for example, in the magnetic applications field (manufacture of magnetic tapes and materials, especially for use in video, after deposition of a magnetic coating or of very thin films of ferromagnetic material, etc). They are also of particular interest for the production of metallized films. This application also forms a subject of the present invention.

The metallized films produced within the scope of the invention are particularly suitable for use as plane or curved reflecting surfaces (parabolic surface, etc).

After being metallized under known conditions, using known techniques such as, for example, vacuum evaporation, ionic plating, cathodic spraying, with the deposition of gold, silver, copper or aluminium, etc, the metallized composite films having, if desired, received a deposit of a protective coating, are generally attached onto a suitable support by means of an adhesive layer. These reflecting surfaces will therefore function either through the transparent polymeric layer or through a layer of protective varnish deposited on the metallized layer.

The gloss of the metallized film may be determined by means of any known method such as, for example, by means of a glossmeter or a goniophotometer. In this context, Doctor Lange's glossmeter may advantageously be used, the apparatus being standardized (100 graduation mark) with the aid of a silvered mirror. The gloss values of the metallized film are measured by light reflection, either directly, or indirectly through the composite film itself. In the case of the films of the invention, it is found that the difference in measurement between the two gloss values (gloss difference) is less than 15% and frequently less than 10%.

The coextruded films of the invention, metallized on one of their surfaces, and whose gloss difference is less than 15%, also form a subject of the present invention. These films generally have a gloss value greater than 120 (DIN standard 67-530).

The properties of the composite films of the present invention, the characteristics of the added fillers, and the gloss optical properties are defined as follows:

Roughnesses

The roughness of a film is generally expressed using 2 values:

a value corresponding to the total roughness $R_t$ a value corresponding to the average roughness $R_a$ (also known as CLA, in accordance with the English nomenclature "center line average").

The total roughness $R_t$ and the average roughness $R_a$ are defined and their measurements are described in the international standard ISO R 468.

The total roughness is measured according to the international standard using a Perthen S.6.P. apparatus.

The measurement corresponds to the mean of 10 results, the various measurement conditions being chosen as follows: limiting or cut-off wavelength value: 0.08 micron; feeling length: 1.5 mm; stylus curvature radius: 3 microns; stylus pressure force: 30 mg.

Percentage of scattered light: this measurement characterizes the film haze; it is carried out according to the ASTM standard D 100.

Coefficient of friction: $\mu_s$; $\mu_d$

This is the determination of the film/film friction measured at an initial movement (static coefficient) or in movement (dynamic value) when a film moves in relation to another at a low speed.

This measurement is performed according to the standard 311 A British Standard 2782.

Film/metal friction coefficient: $\mu_k$

The coefficient $\mu_k$ is measured using a method similar to that described on page 11, (paragraph 3), in European Patent Application No. 66,997, but with a change in some measurement conditions, so as to make it possible to increase the speed of travel (speed of travel: 5 m/minute; bar feed angle: 195° C.; tape width: 2.5 cm).

Characteristics of the fillers

Volume median diameter

The volume median diameter is the equivalent spherical diameter corresponding to 50% of the volume of the particle population read off on the cumulative distribution curve relating the volume percent to the particle diameter.

The spherical equivalent diameter of a particle means the diameter of a sphere whose volume is equal to that of the particle.

The particle size distribution curve is established using the various methods described in the prior art and in particular by means of photometry with centrifuging with the aid of the Horiba/Capa 500 apparatus.

This method makes it possible to measure the change in the absorbance of a suspension in which the particles sediment as a function of the time t. This absorbance is defined by the relationship $$\text{Ln} \frac{Io}{I}$$

and it is related to the characteristics of the suspension by the formula:

$$\left[ \text{Ln} \frac{Io}{I} \right]_{dx} = KE(d_x) \cdot n(d_x) \cdot (d_x)^2$$

$I_0$: light transmitted by the pure liquid
I: light transmitted by the suspension
K: constant which is a function of the concentration of the suspension and of the cell thickness
E ($d_x$): extinction coefficient (taken as equal to 1 whatever the diameter)
n ($d_x$): number of particles of diameter $d_x$.

The rate of sedimentation is related to the spherical equivalent diameter of the particles via the Stokes formula.

(Cf. work by T. Allen: Particle Size Measurement, third edition 1981).

Gloss determination

The gloss is determined by measuring the light reflected by the film using a Dr Lange glossmeter according to the DIN standard 67-530.

The following examples illustrate the invention.

EXAMPLE 1

A composite film with two layers of polyethylene terephthalate is produced, the outer layer B being filled, the layer A being unfilled. The polyethylene terephthalate polymers have been produced by transesterification of dimethyl terephthalate with ethylene glycol, using manganese acetate as interchange catalyst, followed by a polycondensation using antimony as catalyst, which brings the polymer viscosity to IV=0.64.

The filler present in the layer B in a proportion of 0.35% (i.e. 3500 ppm) by weight is a calcium carbonate introduced in the form of a glycol suspension which is incorporated into the reaction mixture at the end of the interchange. The particle size distribution is characterized by the volume median diameter: $\phi_v$ median=0.7 micron (measured with the Horiba/Capa 500).

The overall film thickness is: 12 microns.

The thickness of the layer (B) is 0.8 micron.

The ratio of the thickness of the layer (B) to the layer (A) is 7.1%.

In this manner, after a biaxial drawing performed under the usual conditions (lengthwise followed by transverse), a composite film which has the following properties is obtained:

percentage of scattered light: 0.3

| | |
|---|---|
| roughness $R_t$ = 0.09 micron | outer face (B) |
| roughness $R_a$ = 0.011 micron | |
| roughness $R_t$ = 0.05 micron | outer face (A) |
| roughness $R_a$ = 0.003 micron | | static friction coefficient $\mu_s$=0.53 film/film
dynamic friction coefficient $\mu_d$=0.38 film/film (layer A/layer B)
friction coefficient $u_k$ (film/metal) $(u_k)_{10}$=0.2
$\Delta\mu_k$=15

This film is vacuum-metallized using aluminium vapour. The gloss, measured on the metal side, is 132 and is still 125 through the film; the gloss difference is 5.3%.

COMPARATIVE EXAMPLE 1

When the calcium carbonate in the layer (B) is replaced with another calcium carbonate which has a mean diameter of 0.4 micron and is used in the same quantity, the following results are noted:

percentage of scattered light=0.3
$\mu_s$>1.5
$\mu_d$ not measurable (beats)
$\Delta\mu_k$=75

This comparative example demonstrates the typical effect of the median diameter of the filler.

EXAMPLE 2

A three-layer film with an overall thickness of 23 microns is produced using the procedure of Example 1. The two outer layers, 0.4 micron thick, are filled with the same calcium carbonate as in the preceding example.

weight proportion of filler: 0.4% (4,000 ppm)
median $\phi_v$: 0.7 micron

The film shows that the ratio of the thickness of one layer (B) to that of the layer A is equal to 1.8% percentage of scattered light: 0.4
roughness of the layers (B)

$R_T$=0.1 micron $R_a$=0.01 micron

The friction coefficients are as follows:
$\mu_s$=0.6
$\mu_d$=0.5
$\mu_k$=0.2
$\Delta\mu_k$=20

The film produced was metallized as in Example 1. The gloss values are as follows:
Metallized face: 130
Unmetallized face: 120.

The gloss difference is 7.7%.

COMPARATIVE EXAMPLE 2

A three-layer film 36 microns in thickness is produced as a comparative example. The two outer layers, 1.5 microns in thickness, are filled with calcium carbonate.
  weight percentage of filler: 0.2% (2,000 ppm)
  median $\phi_v$: 1.7 microns
The film shows
percentage of scattered light: 1.4
roughness $R_T = 0.17$ micron $R_a = 0.011$ micron The friction coefficients are as follows:
$\mu_s = 0.35$
$\mu_d = 0.26$
$\mu_k = 0.2$
$\Delta\mu_k = 0$
The gloss values were measured on a corresponding metallized film.
  Metallized face: 105
  Unmetallized face: 85
The gloss difference is 19%.

EXAMPLE 3

A three-layer film with a thickness of 100 microns is produced, as in Example 2. The two outer layers, 0.7 micron in thickness, are filled with the same calcium carbonate as in Example 2.
  weight proportion of filler: 0.15% (1,500 ppm)
  median $\phi_v$: 0.7 micron
The film shows that the ratio of the thickness of one layer (B) to that of layer A is equal to 0.7%
  percentage of scattered light: 0.6
  roughness of the layers (B)

$R_T = 0.11$ micron $R_a = 0.01$ micron

The friction coefficients are as follows:
$\mu_s = 0.45$
$\mu_d = 0.38$
$\mu_k = 0.2$
$\Delta\mu_k = 10$
($\Delta\mu_k$ was checked on an equivalent 12-micron film, that is to say differing from the film of Example 3 only in the thickness of the core layer).
This film was metallized. The gloss values are as follows:
  Metallized face: 132
  Unmetallized face: 115
The gloss difference is 12.9%.

EXAMPLE 4

A three-layer film with a thickness of 175 microns is produced, as in Example 2. The two outer layers, 1.5 microns thick, are filled with calcium carbonate.
  weight proportion of filler: 0.1% (1,000 ppm)
  median $\phi_v$: 0.7 micron
The film shows that the ratio of the thickness of one layer (B) to that of layer A is equal to 0.8%
  percentage of scattered light: 0.8
  roughness of the layers (B)

$R_T = 0.10$ micron $R_a = 0.01$ micron

The friction coefficients are as follows:
$\mu_s = 0.4$
$\mu_d = 0.35$
$\mu_k = 0.2$
$\Delta\mu_k = 20$ (equivalence measurement)
The gloss values were determined on the metallized film:
  Metallized face: 129
  Unmetallized face: 113
The gloss difference is 12.4%.

We claim:

1. A metallized composite film which comprises as a base, a transparent, drawn polyester thermoplastic composite film having low surface roughness and having an essentially unfilled middle layer (A) covered on at least one of its surfaces with a filled layer (B) containing fine particles dispersed therein, said base having the following properties:
    percentage of scattered light < 1
    total roughness of the outer faces $R_T < 0.15$
    coefficient of film-on-film friction measured in a dynamic and static regime such that $\mu_s < 0.6$ (static regime)

$\mu_d < 0.5$ (dynamic regime), and deposited on said base a metallic coating.

2. The metallized composite film of claim 1 wherein said metallic coating is obtained by metallizing with gold, silver, copper or aluminum.

3. The metallized composite film of claim 1 wherein said metallic coating is deposited by vacuum evaporation.

4. The metallized composite film of claim 1 wherein said metallic coating is deposited by ionic plating.

5. The metallized composite film of claim 1 wherein said metallic coating is deposited by cathodic spraying.

6. The metallized composite film of claim 1 wherein the difference in gloss between the metallized surface and the opposite surface is less than 15%.

7. The metallized composite film of claim 6 wherein the gloss of at least the metallized surface is at least 120.

8. The metallized composite film of claim 1 wherein said base has a percentage of scattered light of 0.8 or less and a total roughness $R_T$ of 0.12 or less.

9. The metallized composite film of claim 1 wherein said base has a thickness x as expressed in micrometers and a value y of the percentage of scattered light satisfying the following inequalities:

$$5 < x < 200$$

$$y \leq \frac{x}{400} + 0.5.$$

10. The metallized composite film of claim 1 in which said base includes at least one layer (B) containing from 0.1 to 1% of particles having a volume median diameter of between 0.6 and 1.5 micrometers, and in which the thickness of the layer (B) does not exceed 3 microns.

11. The metallized composite film of claim 1 wherein the base layer has at least one layer (B) such that the following inequality:

$$\Delta\mu_k = \frac{(\mu_k)_{400} - (\mu_k)_{10}}{(\mu_k)_{10}} \times 100 \leq 40$$

where $(\mu_k)_{10}$ and $(\mu_k)_{400}$ denote, respectively, the values of the coefficient of film on metal friction after the passage of 10 meters and 400 meters of tape, is satisfied.

12. The metallized composite film of claim 11 in which the coefficient $\Delta\mu_k$ does not exceed 25.

13. The metallized composite film of claim 1 in which the base film comprises a filled layer (B) on both faces of the middle layer (A).

14. The metallized composite film of claim 13 wherein the layers (B) are the same.

15. The metallized composite film of claim 13 wherein the layers (B) are different.

16. The metallized composite film of claim 1 wherein the polyester thermoplastic of the base film is a homopolymer of ethylene terephthalate or a copolymer comprising at least 80% by weight of ethylene terephthalate repeating units.

* * * * *